United States Patent
Mopur et al.

(10) Patent No.: US 8,881,132 B2
(45) Date of Patent: Nov. 4, 2014

(54) SYSTEM AND METHOD FOR UPDATE OF FIRMWARE OF A STORAGE ARRAY CONTROLLER IN A STORAGE AREA NETWORK

(75) Inventors: Satish Kumar Mopur, Bangalore (IN); Vivek Mehrotra, Bangalore (IN); Saikat Mukherjee, Bangalore (IN); Satyaprakash Rao, Marlborough, MA (US); Sushil Kumar Singh, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1523 days.

(21) Appl. No.: 12/398,185

(22) Filed: Mar. 5, 2009

(65) Prior Publication Data

US 2010/0229166 A1  Sep. 9, 2010

(51) Int. Cl.
- *G06F 9/44* (2006.01)
- *G06F 9/445* (2006.01)
- *G06F 15/177* (2006.01)
- *G06F 3/06* (2006.01)

(52) U.S. Cl.
CPC .............. *G06F 3/0632* (2013.01); *G06F 8/65* (2013.01); *G06F 3/067* (2013.01); *G06F 3/0617* (2013.01)
USPC ............ 717/171; 717/176; 709/221; 709/223

(58) Field of Classification Search
None
See application file for complete search history.

(56) References Cited

U.S. PATENT DOCUMENTS

| | | | | |
|---|---|---|---|---|
| 7,406,310 | B2* | 7/2008 | Okita et al. | 455/418 |
| 7,704,147 | B2* | 4/2010 | Quraishi et al. | 463/42 |
| 7,802,083 | B2* | 9/2010 | Gurumoorthy et al. | 713/1 |
| 7,818,405 | B2* | 10/2010 | Appaji | 709/221 |
| 8,041,543 | B2* | 10/2011 | Mopur et al. | 702/186 |
| 8,054,763 | B2* | 11/2011 | Mehrotra et al. | 370/254 |
| 8,081,961 | B2* | 12/2011 | Okita et al. | 455/418 |
| 8,261,018 | B2* | 9/2012 | Balachandriah et al. | 711/117 |
| 8,321,858 | B1* | 11/2012 | Marmaros et al. | 717/173 |
| 2002/0152305 | A1* | 10/2002 | Jackson et al. | 709/224 |
| 2004/0210628 | A1* | 10/2004 | Inkinen et al. | 709/201 |
| 2006/0130042 | A1* | 6/2006 | Dias et al. | 717/168 |
| 2006/0190938 | A1* | 8/2006 | Capek et al. | 717/161 |
| 2007/0192763 | A1* | 8/2007 | Helvick | 717/168 |
| 2008/0154805 | A1* | 6/2008 | Gurumoorthy et al. | 706/12 |
| 2009/0187899 | A1* | 7/2009 | Mani et al. | 717/168 |

OTHER PUBLICATIONS

Chambers, C., et al. "Patch Scheduling for On-line Games," Proceedings of the 4th ACM SIGCOMM Workshop on Network and System Support for Games [online], 2005 [retrieved Jun. 27, 2014], Retrieved from Internet: <URL: http://dl.acm.org/citation.cfm?id=1103615>, pp. 1-6.*

* cited by examiner

*Primary Examiner* — Don Wong
*Assistant Examiner* — Todd Aguilera

(57) ABSTRACT

A system and method for update of firmware of a storage array controller of a storage device in a storage area network. The I/O workload of the storage device is monitored to obtain workload information regarding I/O traffic of the storage device. The workload information is analyzed to identify patterns in the I/O traffic of the storage device. Based on one or more identified patterns in the I/O traffic, future I/O workload of the storage device is forecasted, and, according to the forecasted future I/O workload, at least one firmware update is scheduled.

17 Claims, 3 Drawing Sheets

SYSTEM AND METHOD FOR UPDATE OF FIRMWARE OF A STORAGE ARRAY CONTROLLER IN A STORAGE AREA NETWORK

BACKGROUND

A file server is a computer that provides file service relating to the organization of information on storage devices, such as disks. The file server includes a storage operating system that implements a file system to logically organize the information as a hierarchical structure of directories and files on the disks.

The storage devices in a file server environment are typically disk drives organized as a disk array, wherein each disk is a self-contained rotating magnetic media storage device. A disk array further comprises disk array controllers which manage the physical disks drives and presents them to a server as logical units, and forms the interface to a storage area network for server access. The term disk in this context is synonymous with a hard disk drive (HDD), a direct access storage device (DASD) or a logical unit number (LUN) in a storage device. Unless the context indicates otherwise, the term "disk" as used herein is intended to embrace not only magnetic storage devices, but also optical, solid state and other types of storage devices.

A storage area network (SAN) is an architecture to attach remote storage devices to servers in such a way that the storage devices appear as locally attached to the operating system. Network Attached Storage (NAS), in contrast to SAN, uses file-based protocols where it is clear that the storage devices are remote.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
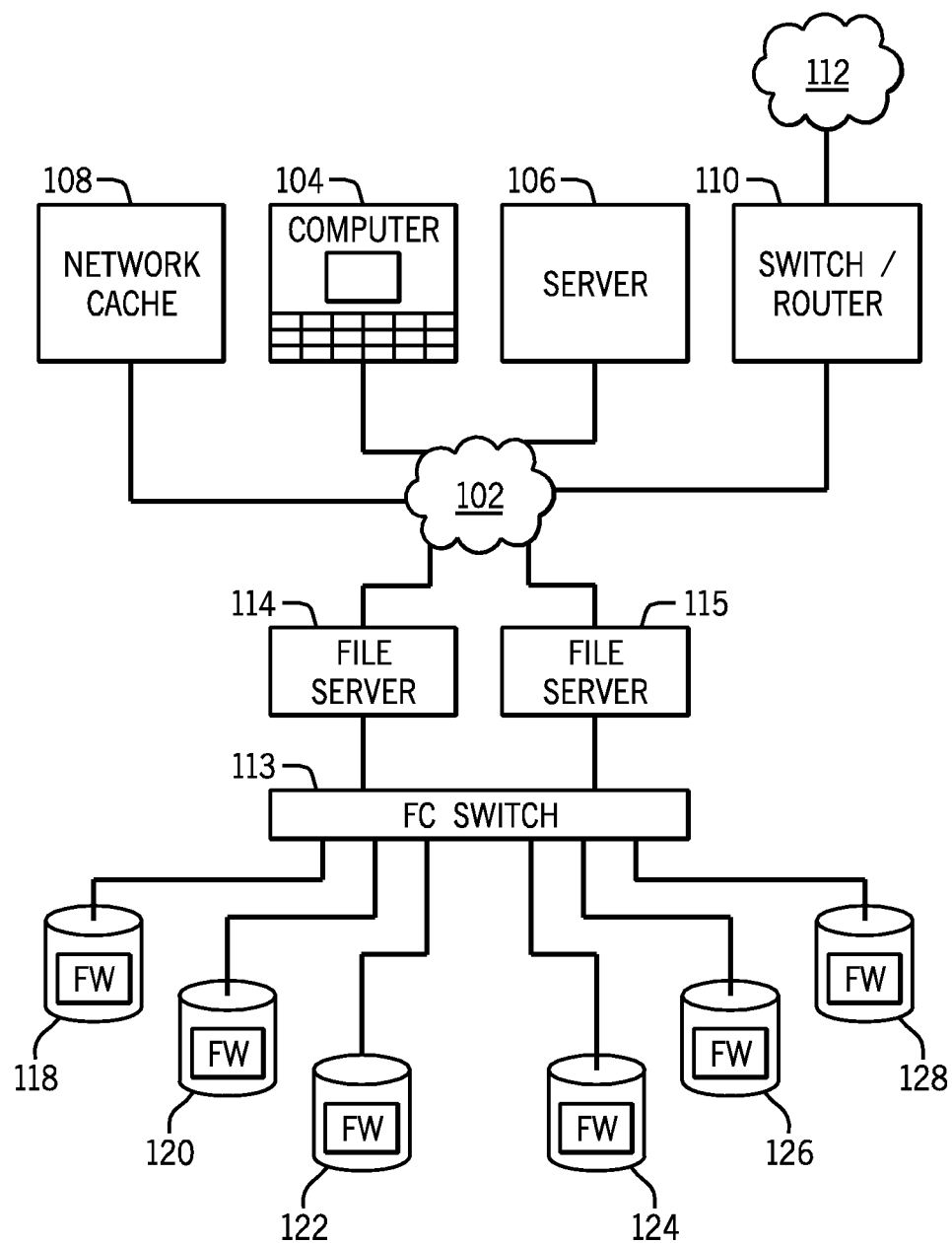
FIG. 1 is a schematic block diagram of an exemplary storage area network (SAN) environment.

FIG. 1 is a schematic block diagram of an exemplary storage area network (SAN) environment 100. The network 100 is based around a local area network (LAN) 102 interconnection. However, a wide area network (WAN), virtual private network (VPN), or a combination of LAN, WAN and VPM implementations can be established. For the purposes of this description the term LAN should be taken broadly to include any acceptable networking architecture. The LAN interconnects various clients based upon personal computers 104, servers 106 and a network cache 108. Also interconnected to the LAN may be a switch/router 110 that provides a gateway to the well-known Internet 112.

In this implementation, exemplary file servers 114 and 115 are connected to the LAN 102. The file servers, described further below are file servers configured to control storage of, and access to, data in a set of interconnected storage volumes. The file servers 114, 115 are each connected to one of a multiplicity of ports on a fibre channel switch 113 that also connects to a fibre channel N-port based storage device 118, 120, 122, 124, 126 and 128. The number of file servers and storage devices connected to the fibre channel switch are variable and few of each are shown by way of example.

All storage devices, including storage devices 118, 120, 122, 124, 126 and 128 include their own firmware (FW) that facilitates operation, network communication and control of the respective disk drives. Occasionally, a vendor may need to update the firmware of storage array controllers within one or more storage devices to ensure that the device benefits from design changes and/or enhancements. At such times, information transfer to and from the disk may be interrupted.

The embodiments described below enable a user to perform a FW upgrade for storage array controllers of a storage device of a SAN without I/O interruption based on assessment of storage device workload periods. Such embodiments assess the configuration of a storage device, analyze the workload of the storage device over a period of time and attempt to identify an I/O workload pattern having a repetitive nature, and forecast suitable time periods for performing a FW upgrade based on an identified I/O workload pattern and comparing those patterns against a calculated threshold for a given configuration of the storage device.

A workload monitor may be used to perform trend analysis on the I/O workload of the storage device when analyzing the workload. Based on this trend analysis, workload forecasting can be undertaken to forecast future workloads of the storage device. A decision support system can then be implemented which is adapted to analyze the physical configuration of the storage device, compute the workload thresholds based on physical configurations obtained from the device and to forecast suitable time periods for performing a FW upgrade of the storage array controllers based on the forecasted future workload of the storage device. The length of the forecasted time period depends upon the time taken to resync the storage array controllers for a given physical configuration. The length of the forecasted time period should be greater than this resync time.

The decision support system may be further adapted to rate and/or prioritize the forecasted suitable time periods according to a determined level of suitability. Such a level of suitably may be determined according to factors such as length of time period, user preference(s), forecast workload and/or a level of confidence in the forecast workload. Embodiments may therefore be advantageous to SAN environments which have a low tolerance to downtimes and/or sensitive to I/O timeout constraints.

Embodiments are applicable to SAN environments in which storage virtualization is employed. Storage virtualization is generally defined as the "transparent abstraction of storage at the block level." In essence, virtualization separates logical data access from physical data access, enabling a user to create large storage pools from physical storage. Virtual storage devices are created from these pools and are allocated to servers on the network as logical storage when needed.

Virtual storage reduces the physical one-to-one relationship between servers and storage devices. The physical disk devices and distribution of storage capacity become transparent to servers and applications. The goal of products and solutions using storage virtualization therefore is to simplify management.

There are three levels within a networked storage environment in which virtualization can occur: the server level, storage network or SAN fabric level, and storage system level. These levels can be used together or independently to increase the benefits to users substantially.

Particular embodiments may be implemented in Enterprise Virtual Array (EVA) storage systems. An EVA storage system is a networked storage environment on which virtualization occurs at the storage system level with storage array controllers.

Embodiments may undertake the following steps:

analyse the physical configuration of a storage device, such an array of disks and storage array controllers, to obtain configuration information regarding the physical configuration of the storage device (including, for example, the number of physical and virtual disks making up the storage device, and the storage array controller(s) of the storage device);

establish the I/O workload of the storage device so as to obtain workload information including, for example, statistical information about the rate of I/O traffic measured in Mega-Bytes Per Second (MBPS) and/or I/Os Per Second (IOPS); and determine one or more recommended time periods in which to perform a FW upgrade process of the storage array controllers on the storage device based on the obtained configuration information and workload information and one or more rules defining a category into which a time period can be placed.

Typical rules may comprise parameters which influence a workload threshold ("Maximum Threshold") below which a FW upgrade may be performed. For example, such parameters can include limits on safe workload for an upgrade against the number of disks making up the storage device, re-synchronization time, and the number and size of a permitted I/O spike for a certain duration of time. Similar or additional parameters which influence the rule(s) for other storage devices may be used. By way of example, the parameters and rules may be configured and/or implemented in a Decision Support System.

The step of establishing the I/O workload of the storage device may comprise analysis of the workload, smoothing of random fluctuations in measured workload, assessment of spikes in measured workload, categorization of measured workload into different categories, such as "Low" and "High" for example.

The step of determining a recommended time period may comprise using trend analysis and forecasting techniques, such as regression analysis, across one or more time periods to forecast the occurrence of a recommended time period in the future. It is made sure that the recommended time period is a recommendation of a time block where forecasted I/O load is within the calculated threshold limit and the length of the time block is more than the re-synchronization time of storage controllers for a given physical configuration of storage device.

Based on the determined recommended time periods, a FW upgrade can be scheduled to automatically complete or manually selected according to user preference.

Furthermore, to take account of changes to the workload or configuration of the storage device, the above mentioned steps can be repeated as necessary or periodically.

Figure 2:
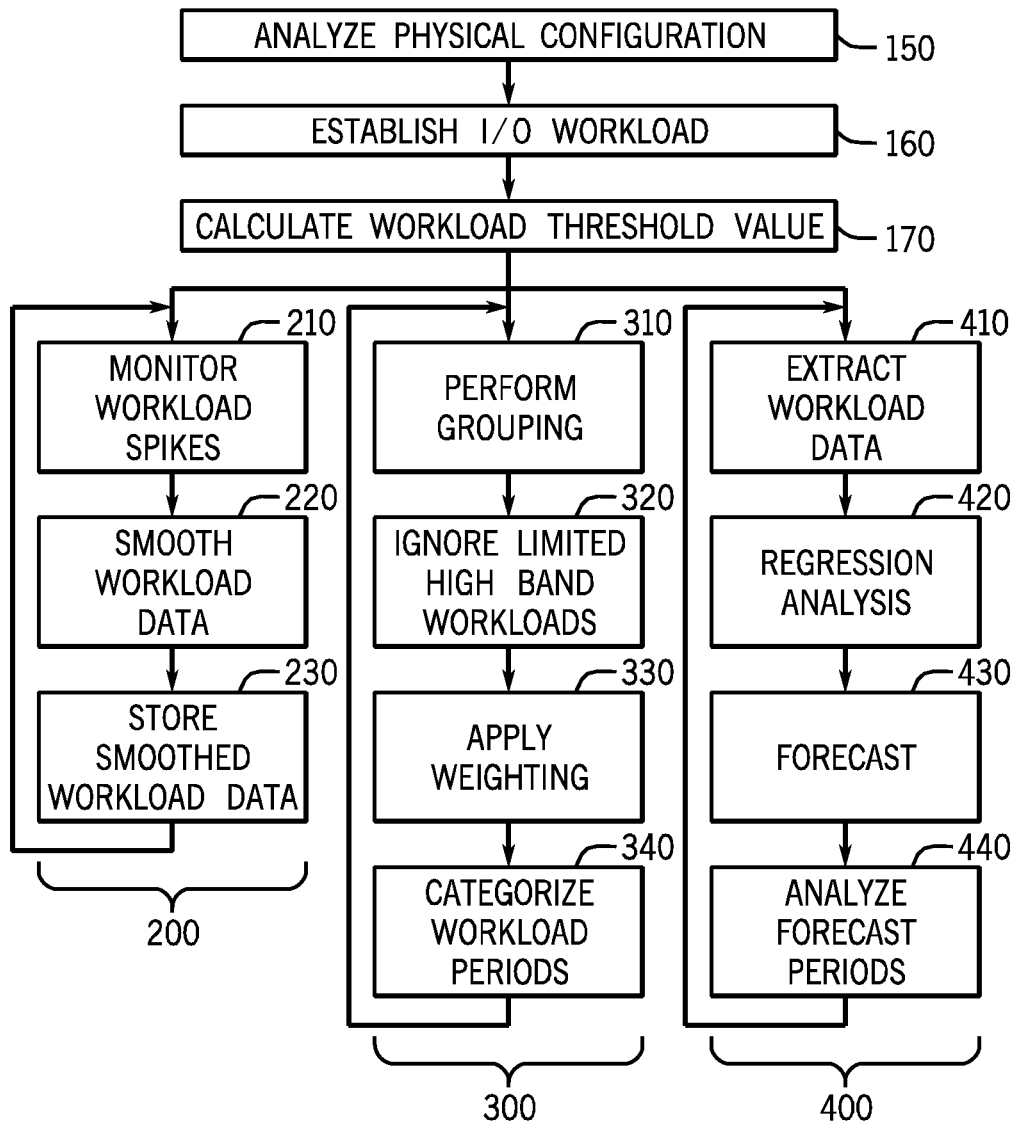
FIG. 2 shows a flow diagram of a method according to an embodiment.

Referring to FIG. 2, a flow diagram of an embodiment is shown and will now be described.

The method begins in step 150 with the physical configuration of the storage device being analyzed so as to obtain configuration information including, for example, the number of physical and virtual disks making up the storage device, the storage array controller(s) of the storage device (and respective state of the controller(s)), and the current version of the storage device's FW. Step 150 may also be configured to be undertaken in response to a signal indicating, for example, that a physical change to the storage device has been made. Such a signal may be provided by a user or by detection means adapted to detect the disconnection/connection of a disk from/to the storage system for example.

Next, in step 160, the I/O workload of the storage device is established so as to obtain workload information such as a measure of the rate of traffic to/from the storage controllers of storage device measured in MBPS (and/or IOPS). The workload information is recorded and stored in a database along with the date and time with which it is associated. For example, each database entry may be provided with a date and/or time stamp indicating the date and/or time at which the workload information was measured. Step 160 may be repeated over time to obtain database of workload information with respect to time, with the regularity of repetition being adapted or controlled depending on accuracy considerations, for example.

The method continues to step 170 in which a workload threshold value ("Maximum Threshold") is calculated, the threshold defining the value of workload beyond which performing a FW upgrade is considered not to be recommended or safe. In calculating the value of Maximum Threshold, the method can take account of factors such as the physical configuration of the storage device, acceptable levels of disruption in I/O processing. Further, such parameters influencing the calculation of Maximum Threshold may be different for different storage devices.

The method then proceeds to undertake workload analysis in order to determine one or more time periods in which a FW upgrade process may be performed on the storage device without adversely affecting is performance or disrupting I/O processing. This workload analysis can be separated into three distinct procedures: Workload smoothing (200); workload grouping/categorization (300); and workload trending/forecasting (400).

Workload Smoothing (200)

A workload smoothing process is undertaken in order to reduce random fluctuations in workload. Known data smoothing techniques (such as a Moving Average (MA) algorithm) can be employed and such techniques can be shifted per workload sample for all samples over a period of time. Other smoothing techniques can also be applied in place of MA algorithm. This can be made as configurable parameter in the solution for the user to choose a particular algorithm best suited in the environment. The smoothing process can also include the assessment of workload spikes (short-term large fluctuations in workload) since repeated short duration I/O workload spikes may adversely affect a FW upgrading process. By way of example, the occurrence of workload spikes is monitored and the peak value and duration of detected spikes is recorded along with a time stamp indicating the time at which the workload spike(s) occurred.

The workload smoothing process (200) shown in FIG. 2 comprise three steps, 210, 220 and 230.

In step 210, the occurrence of workload spikes is monitored by determining when a workload spike exceeds the Maximum Threshold and recording the duration of time for which this occurs. Other lower threshold values (for example, Medium Threshold) may be defined and used to monitor the occurrence of spikes having a lower peak value than the Maximum Threshold.

Step 220 comprises smoothing the workload data across a period of time such as the maximum time ("Upgrade Period") required for a storage device to complete a FW upgrade process and be ready for I/O servicing. The smoothed workload data is then stored in a workload database in step 230 along with data relating to the detected workload spikes.

Workload Grouping/Categorization (300)

Here the I/O workload values are grouped/categorized and weighted along with time stamps, as will be explained. The group or category to which a workload value is determined to belong is defined according to rules. In the example below, the range of workload values from zero to Maximum Threshold is divided into two sub-ranges (see Table 2 below) which can be subsequently used for FW upgrade recommendations.

Table 1 below defines workload bands, their ranges, limit values and associated level of importance (i.e. weighting value).

TABLE 1

| Workload Band | Band Range | Band Limit Values | Weight Value |
|---|---|---|---|
| Low Band | 0 to Maximum Threshold | Low Band Threshold Value = Maximum Threshold | Weight LB |
| High Band | Maximum Threshold to Maximum Workload | High Band Threshold Value = Maximum Workload | Weight HB |

In Table 1 above, Weight Low Band (LB) and Weight High Band (HB) are defined by Equations 1 and 2, respectively, as follows:

$$\text{Weight LB} = 1 \quad (1)$$

$$\text{Weight HB} = 1 - \frac{(\text{Current I/O Workload Value} - \text{Low Band Threshold Value})}{(\text{High Band Threshold Value} - \text{Low Band Threshold Value})}, \quad (2)$$

where Current I/O Workload Value is greater than Low Band Threshold. Thus, it will be understood that the value of Weight HB is linearly distributed across workload in the High Band, ranging from 0 to 1 across the High Band. Such a weighting process is chosen because, though small count of High Band values are tolerable, assigning a weight less than 1 ensures that trending of the workload performed subsequently factors in these values also thereby making the trending process safer. Based on these workloads bands, a grouping process then assesses workload values which are:

a) below Maximum Threshold, for a duration of time greater than upgrade duration (in Low Band workload conditions); and b) above Maximum Threshold, for a duration of time greater than upgrade duration (in High Band workload conditions).

There may be a limited count of High Band workload values in a duration, which is considered if it is far less than Low Band Workload values count in that duration (for example, count of High Band workload is 5% of Low Band workload count). This limited count of High Band I/O Workload values is weighted (as per Table 1 above) and considered as a part of the Low Band Workload. Low Band Workload Values are always weighted with a value of one (as per Table 1 above).

Workload Bands having duration greater than Upgrade Duration are then categorized according to Table 2 below.

TABLE 2

| Period Category | Description |
|---|---|
| Safe | Rule 1 - Continuous (smoothed) Low Band I/O workload (i.e. below Maximum Threshold) over a duration greater than Upgrade Duration<br>Rule 2 - Number of spikes observed over the duration is less than a desired value (user tunable) |
| Safest | Safest Period = K × Safe Period, where K <= 1 (user tunable)<br>Safest Period is a duration less than or equal to a safe period based on user choice, controlled by K |
| Unsafe | I/O Workload above Maximum Threshold, for a period greater than Upgrade Duration |
| Error | An error in obtaining the I/O throughput or potential erroneous prediction occurred. |

It will be appreciated from Table 2 that categorization (and therefore subsequent recommendation of a safe upgrade time window) can take account of spike assessment information (i.e. spike count and width) obtained from the smoothing process (200).

Figure 3:
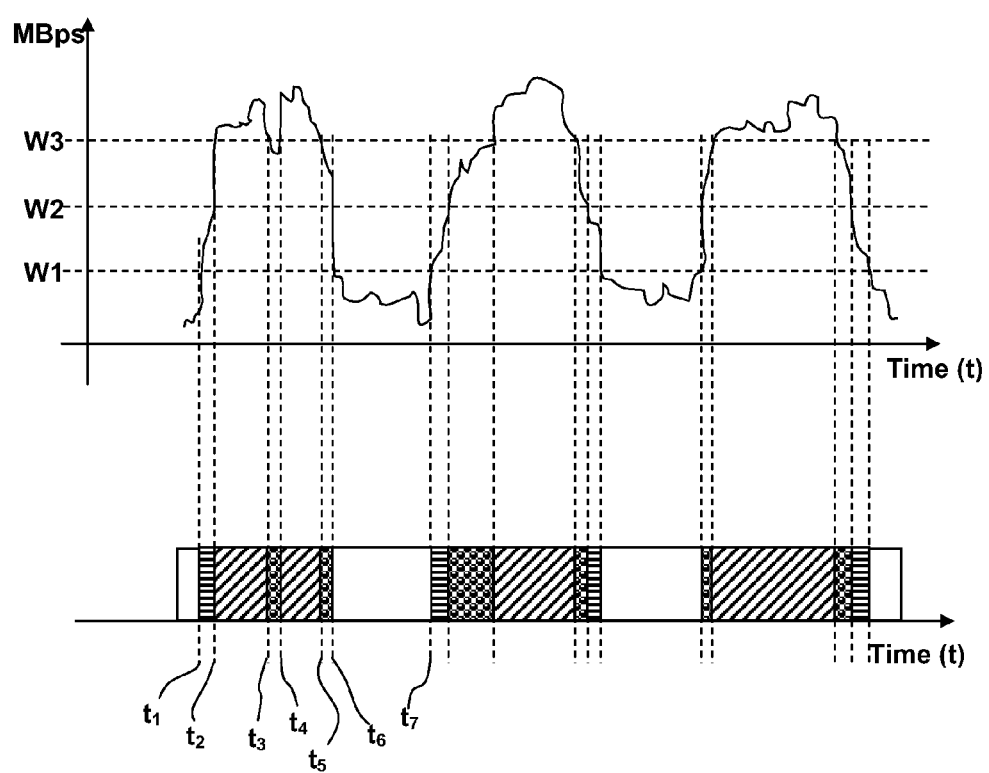
FIG. 3 shows an exemplary variation of I/O workload values against time and illustrates how the workload variation can be grouped and categorized according to an embodiment.

By way of demonstrating the above, a variation of recorded I/O workload values against time is shown in FIG. 3 along with a diagram indicating how the workload values may be categorized. In the example of FIG. 3, Maximum Threshold is defined as having a value W2 measured in MBPS. The range of workload values from zero to Maximum Threshold (W2) is divided into two sub-ranges by threshold "Low Threshold" having a value W1, where W1<W2. Also, the range of workload value from Maximum Threshold (W2) to Maximum Workload is divide into two sub-ranges by a threshold "Limit Threshold" having a value W3, where W2<W3.

As a result, for workload bands or categories may be defined by the thresholds as detailed in Table 3 below.

TABLE 3

| Band Category | Range of Workload Values (MBPS) |
|---|---|
| Safest | 0 to W1 |
| Safe | W1 to W2 |
| Unsafe | W2 to W3 |
| Off Limit | W3 to Max Workload |

Thus, for the variation of recorded I/O workloads values shown in FIG. 3 from Time (T)=t1 to T=t7, the workload values can be grouped and categorized as detailed in Table 4 below.

TABLE 4

| Group Number | Time | Category |
|---|---|---|
| 1 | t1-t2 | Safe |
| 2 | t2-t3 | Off Limit |
| 3 | t3-t4 | Unsafe |
| 4 | t4-t5 | Off Limit |
| 5 | t5-t6 | Un Safe |
| 6 | t6-t7 | Safest |

This approach provides flexibility to the user since the definition of the categories can be varied or "fine-tuned" based on user judgment (possibly taking account of historical workload observations).

The workload grouping process (300) shown in FIG. 2 comprises four steps, 310, 320, 330 and 340.

In step 310, smoothed workload values are grouped into the Low or High band according to the band definitions. Step 320 comprises considering (i.e. ignoring) limited High Band workloads intruding into the Low Band for weighting, and vice versa.

Next, in step 330, weighting is applied to the High Band workloads for consideration in trending or forecasting processes, and the weighted workload value is stored in a database together with time and duration that the workload is within the workload band.

In step 340, the workload periods are categorized according to the category definitions in Table 2.

Trending and Forecasting

Trending and forecasting is performed (using a regression technique for example, a linear regression) to the workload values of the Safe/Safest periods. By way of explanation, the trending and forecasting logic comprises the following:

Using a regression technique to forecast a low workload situation (here, this is linear, although any suitable polynomial curve may be used). Preferably, this is undertaken periodically, wherein the periodicity depends on a required amount of historical data being accumulated;

Using a regression equation to forecast future I/O workload values in conjunction with a least mean square error computation;

Using a forecasted value to re-determine the category of I/O workload and then categorizing the forecasted workload as Safest/Safe/Unsafe (as explained above); and Proposing recommended time periods, for example time periods forecast to have workloads in the Safest and Safe categories, in an order of preference based on factors such as the duration of such periods and number spikes in said period. For example, if FW can be upgraded safely within 15 minutes (the optimal upgrade period required), this is known as a "safe period block". If multiple continuous safe/safest period blocks are identified, the order of preference may be determined by arranging these periods in descending order with the period having the highest number of continuous safe period blocks being top or first in the order of preference.

The above trending and forecasting analysis can be carried out for the same hours of a day (for daily analysis), across days of a week (for daily analysis), and across multiple weeks (for weekly analysis) for identify a predicted I/O pattern, which is repetitive or periodic in nature. Such analysis provides a high level view of various categorized time periods with which the user can plan a FW upgrade.

The trending/forecasting process (400) shown in FIG. 2 comprises four steps, 410, 420, 430 and 440.

In step 410, the workload data of all of the time periods have a workload value in the safe or safest category is extracted from the workload database. Next, in step 420, each time period is processed with a trending algorithm using regression analysis. Based on the results of the regression analysis, future time periods having workloads in the Safest and Safe categories are forecast in step 430. Finally, in step 440, the forecast time periods are analyzed in consideration of factors, such as user preferences and the forecast workload of neighboring time periods, so as to propose recommended time periods for upgrading the FW of the storage device.

It will be understood that embodiments enable the recommendation of time periods within which the FW of a storage device in a SAN environment can be updated whilst minimizing or avoiding disruptions in I/O processing. Such time periods can spans across minutes, hours, days or weeks for example, thereby assisting the scheduling of an optimal time window for undertaking a FW upgrade.

Embodiments may automatically perform a scheduled FW upgrade based on the recommendation(s) and/or user instructions, and performance can be limited to time periods having a detected or forecast workload which is in a determined category of preference, such as a "safest" category.

Embodiments provide for automatic host I/O timeout control with or without user consent, thus reducing the need for user intervention. As an example, a particular Operating System may recommend that having an I/O timeout of 60 seconds or more (for a given set of applications) is tolerable and applications will not be timing out.

While specific embodiments have been described herein for purposes of illustration, various modifications will be apparent to a person skilled in the art and may be made without departing from the scope of the invention.

We claim:

1. A method for update of firmware of a storage controller of a storage device in a storage area network, SAN, comprising:
    monitoring an Input/Output, I/O, workload of the storage device to obtain workload information regarding I/O traffic of the storage device;
    analyzing the workload information to identify patterns in the I/O traffic of the storage device;
    forecasting future I/O workload of the storage device based on one or more identified patterns in the I/O traffic;
    based on the forecasted future I/O workload, identifying plural time periods that are suitable for performing a firmware update to update the firmware of the storage controller;
    counting a number of workload spikes in each of the plural time periods;
    ranking the plural time periods based on respective lengths of the plural time periods and based on the counting of the numbers of workload spikes in the plural time periods, where each of the workload spikes is a workload having a peak value exceeding a predefined threshold, wherein the ranking comprises ranking a first of the plural time periods higher than a second of the plural time periods in response to the counting indicating that the first time period has a smaller number of workload spikes than the second time period; and
    scheduling the firmware update in one of the plural time periods selected according to the ranking.

2. The method of claim 1 further comprising:
    categorizing the forecasted future I/O workload according to categorization rules, the categorization rules defining categories within which an I/O workload is contained.

3. The method of claim 2 wherein identifying the plural time periods is based on the categorizing.

4. The method of claim 2 further comprising analyzing a physical configuration of the storage device to obtain configuration information regarding the physical configuration of the storage device, wherein the categorization rules take into account at least the configuration information.

5. The method of claim 4, wherein the configuration information comprises information relating to at least one of: a number of physical and virtual disks making up the storage device; the storage controller of the storage device; free storage space available; and a current version of the firmware.

6. The method of claim 1, wherein the workload information comprises information relating to at least one of: a number of workload spikes in the I/O workload of the storage device; a duration of a workload spike in the I/O workload of the storage device; and a date and time of a workload spike.

7. The method of claim 1, wherein the storage device comprises an array of physical or virtual storage disks.

8. The method of claim 7, wherein the storage device comprises an enterprise virtual array storage system.

9. The method of claim 1, wherein the ranking based on the respective lengths is based on respective numbers of safe period blocks in the plural time periods, where each of the safe period blocks is an amount of time during which the firmware can be successfully upgraded, and wherein a given one of the plural time periods is ranked higher than a particular one of the plural time periods if the given time period has a larger number of safe period blocks than the particular time period.

10. A system for update of firmware of a storage device in a storage area network, comprising:
an I/O workload monitoring unit to monitor an I/O workload of the storage device to obtain workload information regarding I/O traffic of the storage device;
a data storage medium to store the workload information; and
at least one processor to:
analyze the workload information to identify patterns in the I/O traffic of the storage device;
forecast future I/O workload of the storage device based on one or more identified patterns in the I/O traffic;
based on the forecasted future I/O workload, identify plural time periods that are suitable for performing a firmware update to update the firmware of the storage device;
count a number of workload spikes in each of the plural time periods;
rank the plural time periods based on respective lengths of the plural time periods and based on the counting of the numbers of workload spikes in the plural time periods, where each of the workload spikes is a workload having a peak value exceeding a predefined threshold, wherein the ranking comprises ranking a first of the plural time periods higher than a second of the plural time periods in response to the counting indicating that the first time period has a smaller number of workload spikes than the second time period; and
schedule the firmware update in one of the plural time periods selected according to the ranking.

11. The system of claim 10, wherein the at least one processor is further to categorize the forecasted future I/O workload according to categorization rules, the categorization rules defining categories within which an I/O workload is contained.

12. The system of claim 10, wherein the workload information comprises information relating to at least one of: a number of workload spikes in the I/O workload of the storage device; a duration of a workload spike in the I/O workload of the storage device; and a date and time of a workload spike.

13. The system of claim 10, further comprising a controller to analyze a physical configuration of the storage device to obtain configuration information regarding the physical configuration of the storage device, wherein the configuration information comprises information relating to at least one of: a number of physical and virtual disks making up the storage device, a storage controller of the storage device, free storage space available, and a current version of the firmware.

14. The system of claim 10, wherein the storage device comprises an array of physical or virtual storage disks and one or more storage array controllers.

15. The system of claim 10, wherein the ranking based on the respective lengths is based on respective numbers of safe period blocks in the plural time periods, where each of the safe period blocks is an amount of time during which the firmware can be successfully upgraded, and wherein a given one of the plural time periods is ranked higher than a particular one of the plural time periods if the given time period has a larger number of safe period blocks than the particular time period.

16. A non-transitory computer-readable storage medium storing a computer program that when executed by a computer causes the computer to:
monitor an Input/Output, I/O, workload of a storage device to obtain workload information regarding I/O traffic of the storage device;
analyze the workload information to identify patterns in the I/O traffic of the storage device;
forecast future I/O workload of the storage device based on one or more identified patterns in the I/O traffic;
based on the forecasted future I/O workload, identify plural time periods that are suitable for performing a firmware update to update firmware of the storage device;
count a number of workload spikes in each of the plural time periods;
rank the plural time periods based on respective lengths of the plural time periods and based on the counting of the numbers of workload spikes in the plural time periods, where each of the workload spikes is a workload having a peak value exceeding a predefined threshold, wherein the ranking comprises ranking a first of the plural time periods higher than a second of the plural time periods in response to the counting indicating that the first time period has a smaller number of workload spikes than the second time period; and
schedule the firmware update in one of the plural time periods selected according to the ranking.

17. The computer-readable storage medium of claim 16, wherein the ranking based on the respective lengths is based on respective numbers of safe period blocks in the plural time periods, where each of the safe period blocks is an amount of time during which the firmware can be successfully upgraded, and wherein a given one of the plural time periods is ranked higher than a particular one of the plural time periods if the given time period has a larger number of safe period blocks than the particular time period.

* * * * *